United States Patent
Dooley, Jr. et al.

(10) Patent No.: US 6,189,703 B1
(45) Date of Patent: Feb. 20, 2001

(54) ENDLESS MEDIA FILTRATION SYSTEM

(76) Inventors: John P. Dooley, Jr., 1013 Deep Woods Trail, Brentwood, TN (US) 37027; Cecelia D. Moore, 141 Neese Dr. R-387; Harry A. Kiely, 239 Sunrise Ave., both of Nashville, TN (US) 37211; John D. Hood, Sr., 1889 Carter Creek Pike, Franklin, TN (US) 37064; Caleb N. Bell, III, 1107 Bradley Dr., Franklin, TN (US) 37069

(*) Notice: Under 35 U.S.C. 154(b), the term of this patent shall be extended for 0 days.

(21) Appl. No.: 09/220,117

(22) Filed: Dec. 23, 1998

(51) Int. Cl.[7] .................................................. B01D 33/056
(52) U.S. Cl. .......................... 210/400; 210/401; 210/393
(58) Field of Search .................................. 210/400, 401, 210/396, 393

(56) References Cited

U.S. PATENT DOCUMENTS

| | | | |
|---|---|---|---|
| 620,786 | * | 3/1899 | Koerper et al. . |
| 2,567,266 | * | 9/1951 | Young . |
| 3,036,354 | * | 5/1962 | De Bie . |
| 3,197,030 | * | 7/1965 | Black . |
| 3,225,928 | * | 12/1965 | Black . |
| 3,363,773 | * | 1/1968 | Glos, II . |
| 3,464,563 | * | 9/1969 | Dahlem et al. . |
| 3,485,379 | * | 12/1969 | Hutson . |
| 3,570,674 | * | 3/1971 | Dahlem . |
| 3,706,378 | * | 12/1972 | Markwick . |
| 3,756,411 | * | 9/1973 | Kracklauer . |
| 3,807,559 | * | 4/1974 | Horn . |
| 4,057,437 | * | 11/1977 | Kracklauer . |
| 4,498,988 | * | 2/1985 | Fujita et al. . |
| 4,686,042 | | 8/1987 | Eckardt ................................ 210/386 |
| 5,307,551 | * | 5/1994 | Bratten . |

FOREIGN PATENT DOCUMENTS

| | | | |
|---|---|---|---|
| 3740992 | * | 6/1989 | (DE) . |
| 3808968 | * | 9/1989 | (DE) . |

* cited by examiner

Primary Examiner—Thomas M. Lithgow
(74) Attorney, Agent, or Firm—Zarley, McKee, Thomte, Voorhees & Sease; Dennis L. Thomte

(57) ABSTRACT

An endless media filtration system includes a housing with a pool forming assembly mounted between a pair of side walls. The pool forming assembly includes a central shaft with two spaced-apart containment discs rotatably mounted on the shaft between the side walls. An endless loop filter media belt is supported on an endless loop carrier belt and includes an upper run which is pressed against the peripheral edges of the discs to form a generally semicircular shaped pool along bottom arcs of the discs. A separation pan is located between upper and lower runs of the carrier belt to direct filtered liquid to one side of the carrier belt and out the bottom of the housing. A backwash assembly includes a first spray rod spraying air through the filter media, a second spray rod spraying water through the filter media, and a third spray rod spraying air through the filter media after the filter media has passed under the second spray rod. The spray rods are oriented on the inward side of the filter belt and spray through the filter belt to remove particulate therefrom. A pair of freely rotatable tracking wheels engage the filter media belt and stretch it taut between the tracking wheels to remove wrinkles from the media belt. The media belt is attached to the carrier belt with a rod wrapped in one end of the media belt and tamped into a groove in one link of the carrier belt. The second end of the media belt is wrapped around a second rod, overlapped over the first rod, and tamped into a groove in an adjacent link of the carrier belt.

37 Claims, 5 Drawing Sheets

ENDLESS MEDIA FILTRATION SYSTEM

TECHNICAL FIELD

The present invention relates generally to filtration apparatus, and more particularly to an improved endless media filtration system which utilizes gravity liquid filtration.

BACKGROUND OF THE INVENTION

Gravity-type filtration systems have been used for a number of years to filter particulate from liquids. In general, particulate laden liquid is spread across the width of filter media such that the liquid flows through the media while the particulate is caught within the media to form a cake. As the cake builds, liquid flow is restricted and the fluid level rises on top of the caked particulate to form a pool. Once the fluid level in the pool reaches a predetermined height, the apparatus will shift the media so that liquid again flows across an unobstructed portion of the media.

While these gravity liquid filtration devices have been known for some time, they still suffer several problems. First, prior art filtration systems have utilized a supply of filter media on a reel, which is fed through the filter system, and then cleaned and wrapped on another reel for reuse, or discarded. In order to avoid these problems, an endless filtration system is desirable, which utilizes an endless, continuous loop belt of filtration media which is initially utilized for filtering, washed, and then returned for reuse in the same system.

Because the use of an endless media continuous loop belt requires that one flight of the belt return under the filtering pool, it is desirable to redirect liquid flow from the filtering pool to avoid contamination of the clean fluid.

Another problem with existing endless loop filtration systems is in the cleaning of the filter media.

Finally, endless filter media filtration systems are more prone to sliding or dislodgment of the filter media belt from the carrier belt. In addition, the filter media belt can become wrinkled, which reduces the filtering capacity of the filter media.

SUMMARY OF THE INVENTION

The endless media filtration system of the present invention includes a housing with a pool forming assembly mounted between a pair of side walls. The pool forming assembly includes a central shaft with two spaced-apart containment discs rotatably mounted on the shaft between the side walls. An endless loop filter media belt is supported on an endless loop carrier belt and includes an upper run which is pressed against the peripheral edges of the discs to form a generally semicircular shaped pool along bottom arcs of the discs. A separation pan is located between upper and lower runs of the carrier belt to direct filtered liquid to one side of the carrier belt and out the bottom of the housing. A backwash assembly includes a first spray rod spraying air through the filter media, a second spray rod spraying water through the filter media, and a third spray rod spraying air through the filter media after the filter media has passed under the second spray rod. The spray rods are oriented on the inward side of the filter belt and spray through the filter belt to remove particulate therefrom. A pair of freely rotatable tracking wheels engage the filter media belt and stretch it taut between the tracking wheels to remove wrinkles from the media belt. The media belt is attached to the carrier belt with a rod wrapped in one end of the media belt and tamped into a groove in one link of the carrier belt. The second end of the media belt is wrapped around a second rod, overlapped over the first rod, and tamped into a groove in an adjacent link of the carrier belt.

It is therefore a general object of the present invention to provide an improved endless filter media filtration apparatus.

Another object is to provide a gravity liquid filtration apparatus which directs clean fluid away from the clean flight of the filter media belt.

Yet another object of the present invention is to provide an improved backwash system for cleaning the endless loop filter media belt.

Still another object is to provide a gravity filtration system which prevents wrinkling of the filter media belt, and enhances the retention of the belt on the carrier belt.

These and other objects of the present invention will be apparent to those skilled in the art.

DESCRIPTION OF THE PREFERRED EMBODIMENT

Figure 1:
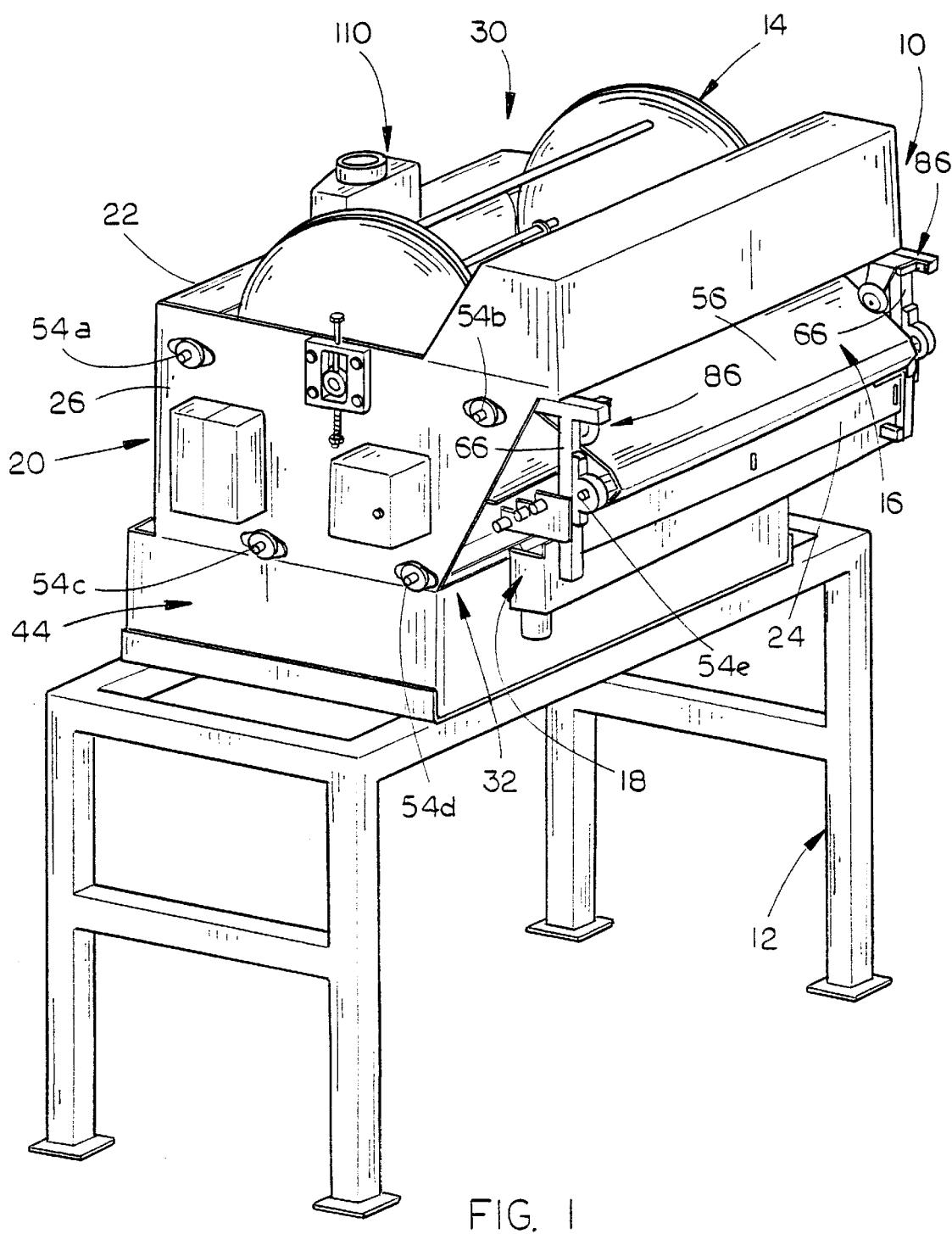
FIG. 1 is a perspective view of the gravity liquid filtration apparatus of the present invention.

Referring now to the drawings, in which similar or corresponding parts are identified with the same reference numeral, and more particularly to FIG. 1, the liquid filtration system of the present invention is designated generally at 10 and includes a support frame 12, a pool forming assembly 14, a filter medium carrier assembly 16, and a filter backwash assembly 18.

A housing 20 supports the pool forming assembly 14, the filter medium carrier assembly 16, and the backwash assembly 18, and includes a forward end 22, a rearward end 24, opposing side walls 26 and 28, and upper and lower ends 30 and 32. As seen in the drawings, forward and rearward plates 34 and 36 converge towards one another and are connected by a bottom plate 38 to form a separation pan 40 located beneath pool forming assembly 14. Separation pan 40 includes at least one drainage spout 42 depending downwardly through the lower end 32 of housing 20, for discharging liquid to a conventional liquid receiving drain tank 44 positioned under the lower end 32 of housing 20.

Figure 2:
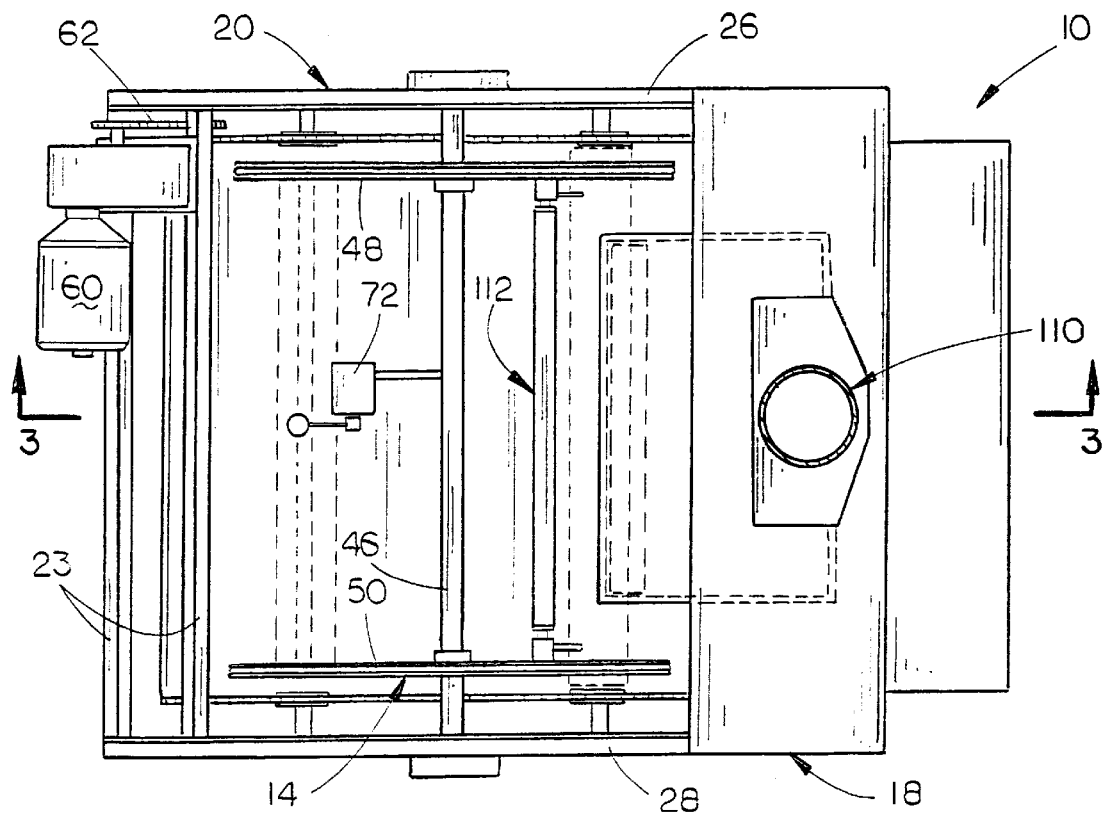
FIG. 2 is a plan view of the apparatus.
Figure 3:
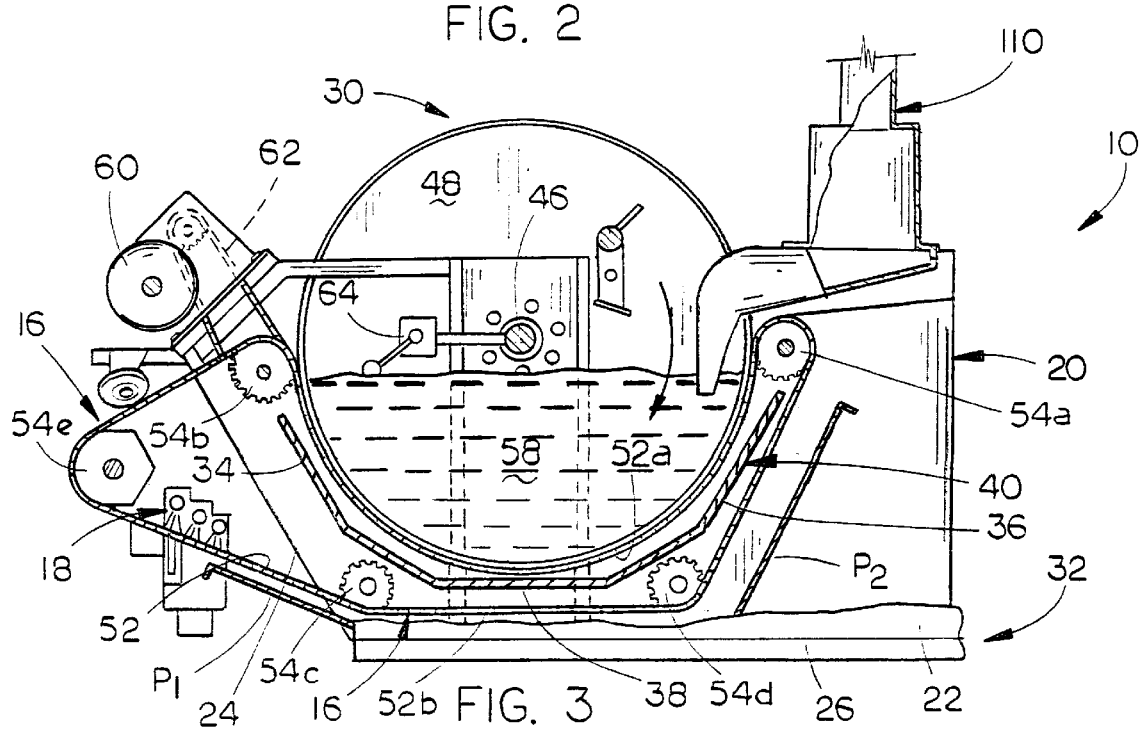
FIG. 3 is a sectional view taken at lines 3—3 in FIG. 2.

Referring now to FIGS. 2 and 3, the pool forming assembly 14 is positioned between side walls 26 and 28, and includes a central shaft 46 extending through each side wall 26 and 28. A pair of containment discs 48 and 50 are mounted on each end of shaft 46 interiorly and proximal to side walls 28 and 26 respectively.

Referring once again to FIG. 3, the filter medium carrier assembly 16 includes an endless carrier belt 52 having an open mesh design, and a plurality of rollers 54 around which the endless carrier belt is supported. A forward roller 54a and a rearward roller 54b are positioned near opposite locations along the corresponding peripheral edges of containment discs 48 and 50, such that an upper run of the endless carrier belt 52 extending therebetween will be pressed along the peripheral edges of the discs along corresponding bottom arcs thereof. When a filter medium belt 56 is supported on the carrier belt 52 along this run, it will pressed against the bottom arcs of the peripheral edges of the discs 48 and 50, thereby permitting a pool of liquid 58 to be formed above the media belt 56 and between the discs 48 and 50.

The filter medium carrier assembly 16 also includes a drive motor 60 which is mounted on the rearward end of housing 20, with a drive chain 62 connected between the drive motor 60 and a sprocket on rearward roller 54b. The operation of drive motor 60 is controlled by the float switch 64. Float switch 64 could be replaced with a hydrostatic switch, conductive switch or some other type of switch.

Figure 4:
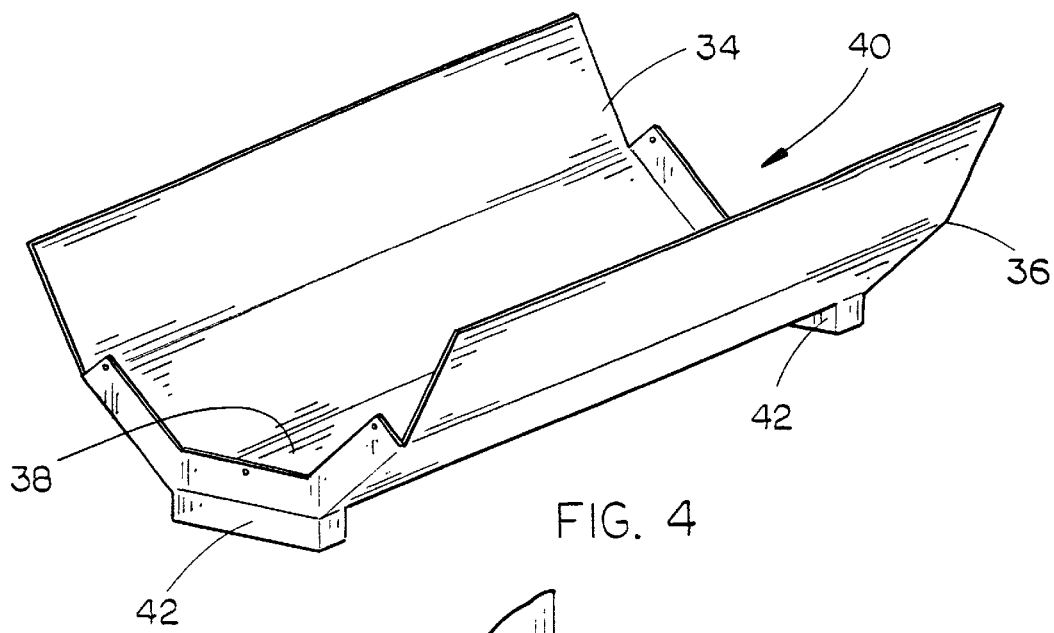
FIG. 4 is a perspective view of the separation pan of the present invention.

As shown in FIG. 3, carrier belt 52 is formed in a continuous endless loop around rollers 54. The loop formed by carrier belt 52 includes an upper run 52a forming the bottom of pool forming assembly 14, and a lower run 52b extending under lower rollers 54c and 54d and spaced-apart from the upper run 52a. Separation pan 40 has its plates 34 and 36 and bottom plate 38 located beneath the upper run 52a of carrier belt 52 and centered under pool forming assembly 14. As shown in FIG. 4, two drainage spouts 42 are located at the opposite transverse ends of bottom plate 38, and extend downwardly therefrom. Drainage spouts 42 are spaced-apart a distance greater than the width of carrier belt 52, such that the lower run 52b of the carrier belt 52 will be located between the drainage spouts 42. In this way, separation pan 40 will direct the clean fluid flow to the sides of the lower run 52b of the carrier belt and filter medium belt, thereby avoiding the filter media entirely and reducing the chance of contaminating the clean fluid.

Referring once again to FIGS. 1 and 3, auxiliary roller 54e is located rearwardly of rearward roller 54b and spaced vertically between rearward roller 54b and lower roller 54c. Auxiliary roller 54e moves the rearward ends of the upper and lower runs 52a and 52b of carrier belt 52, and the associated upper and lower runs of the filter media belt 56 outward rearwardly of the housing 20, for processing by the backwash assembly 18, mounted proximal to the auxiliary roller 54e.

Figure 5:
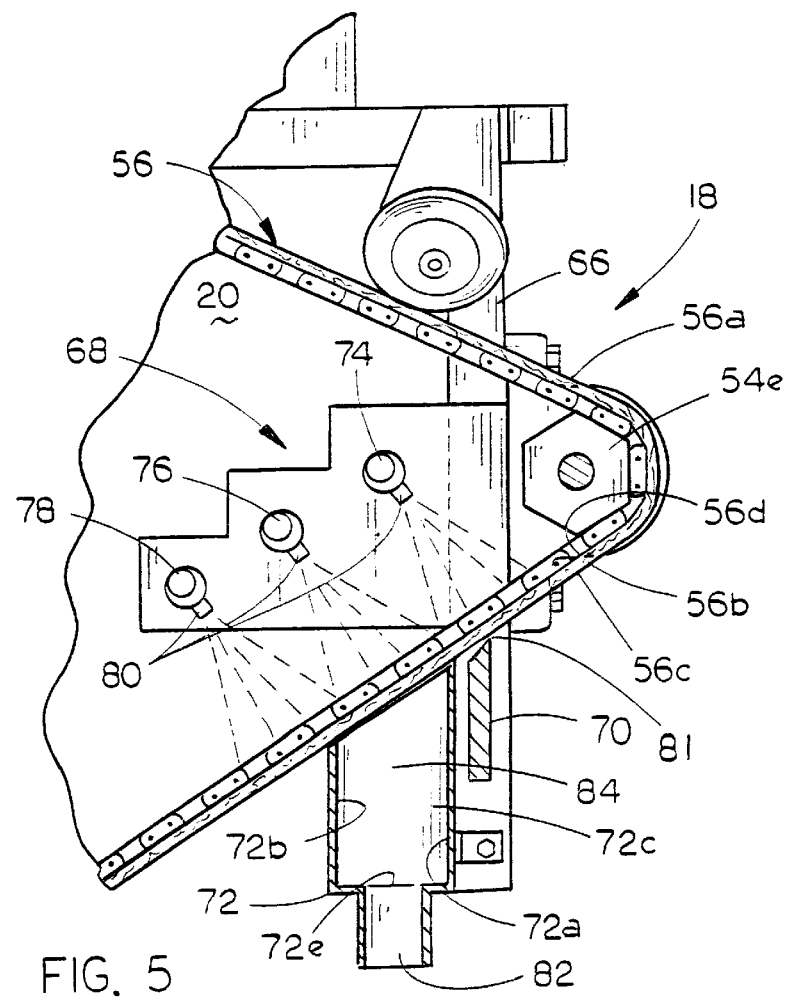
FIG. 5 is an enlarged side elevational view of the backwash assembly of the apparatus.
Figure 6:
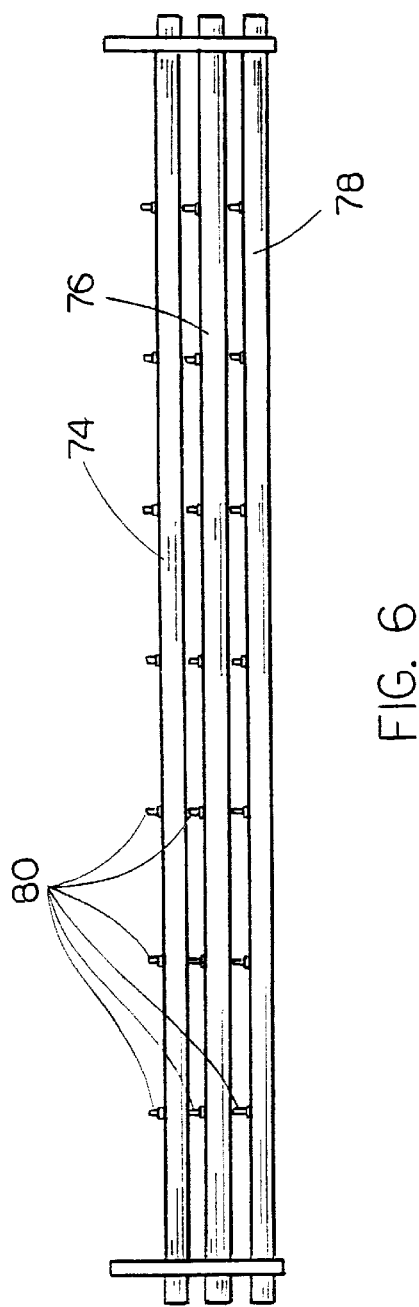
FIG. 6 is a plan view of the backwash assembly of the present invention.

Referring now to FIG. 5, the backwash assembly 18 is shown in more detail, and is supported on the housing 20 by a frame 66. Backwash assembly 18 includes three general components: a spray system 68, a doctor blade 70, and a catch pan 72. As the filter media belt 56 is carried by carrier belt 52, it can be seen that media belt 56 includes an upper run 56a and a lower run 56b, with an outward surface 56c. The spray system 68 is mounted on frame 66, and includes three spray rods 74, 76, and 78 mounted in parallel relationship transverse to the media belt 56, to extend across the width of the media belt 56. Each spray rod 74, 76, and 78 includes a plurality of spaced-apart nozzles 80 along their length for spraying fluid through the filter media to clean the same. Spray system 68 is located between the upper and lower runs 56a and 56b of media belt 56, with nozzles 80 directed downwardly towards the inward surface 56d of media belt 56.

The first spray rod 74 is connected to a source of air, such that the nozzles spray the lower run 56b of media belt 56 with air to remove large portions of the particulate accumulating on the outward surface 56c. Second spray rod 76 is connected to a source of water to rinse and backwash the media belt 56, downstream of first spray rod 74. Third spray rod 78 is connected to a source of air, which is sprayed across belt 56 downstream of second spray rod 76, to remove excess water from the rinse.

In addition to spray system 68, a doctor blade 70 is mounted below the lower run 56b of filter media 56 which extends laterally across the entire width of the filter media belt 56. Doctor blade 70 includes an upper scraping edge 81 which contacts the outward surface 56c of media belt 56, to scrape the belt to remove medium sized particulate therefrom. The particulate sludge drops off of doctor blade 70 into a hopper located on the ground below the system. Doctor blade 70 is spring loaded to bias the blade upwardly against the outward surface 56c of media belt 56, such that anything adhered to the media belt 56 will pass over the doctor blade without tearing the media belt 56. Doctor blade 70 is located downstream of the first spray rod 74, but up stream of second spray rod 76.

Catch pan 72 is located below the lower run 56b of media belt 56 downstream of doctor blade 70 and located under second spray bar 76, to capture backwash water from second spray rod 76. Catch pan 72 includes opposing vertical sides 72a and 72b, and opposing vertical ends 72c and 72d, with a sloping bottom 72e. A drain spout 82 formed in the lower end of sloped bottom plate 72e discharges the accumulated backwash water and particulate from catch pan 72. A spray nozzle 84 in end wall 72c of catch pan 72 will spray water into the catch pan to help drain the fluid and particulate through the drain spout 82. The letters $P_1$ and $P_2$ refer to drainage plates located beneath and outwardly of carrier belt 52, as seen in FIG. 3.

Referring once again to FIG. 1, a pair of media tracking wheels 86 are mounted on frame 66 along each edge of media belt 56. Tracking wheels 86 are located opposite one another on opposite sides of the media belt 56, to pull wrinkles out of the belt and help it track on the carrier belt 52.

Figure 7:
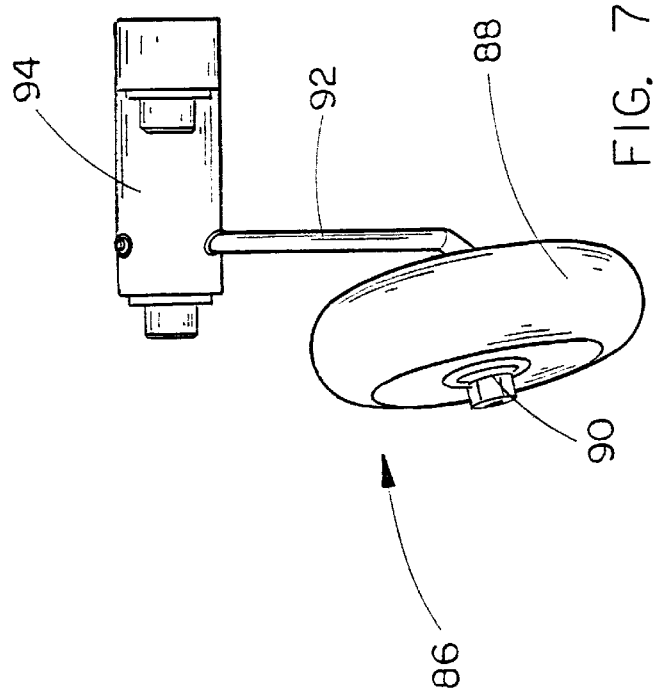
FIG. 7 is an enlarged rear elevational view of one media tracking wheel of the present invention.

As shown in FIG. 7, each media tracking wheel includes a wheel 88 mounted on an axle 90, the axle supported on one end by an arm 92 depending from a bracket 94. Each wheel 88 is oriented in a generally vertical plane which is offset slightly from vertical such that the upper portion of each wheel slopes inwardly towards each other, and the lower surfaces of the wheels slope outwardly away from one another. In addition, the plane of each wheel 88 is also canted inwardly such that a forward, up stream side of the wheels are canted towards one another and the rearward downstream side of the wheels 88 are canted away from one another. This orientation of wheels 88 serves to stretch the portion of the filter media belt 56 transversely outwardly, to eliminate wrinkles and the like.

Figure 8:
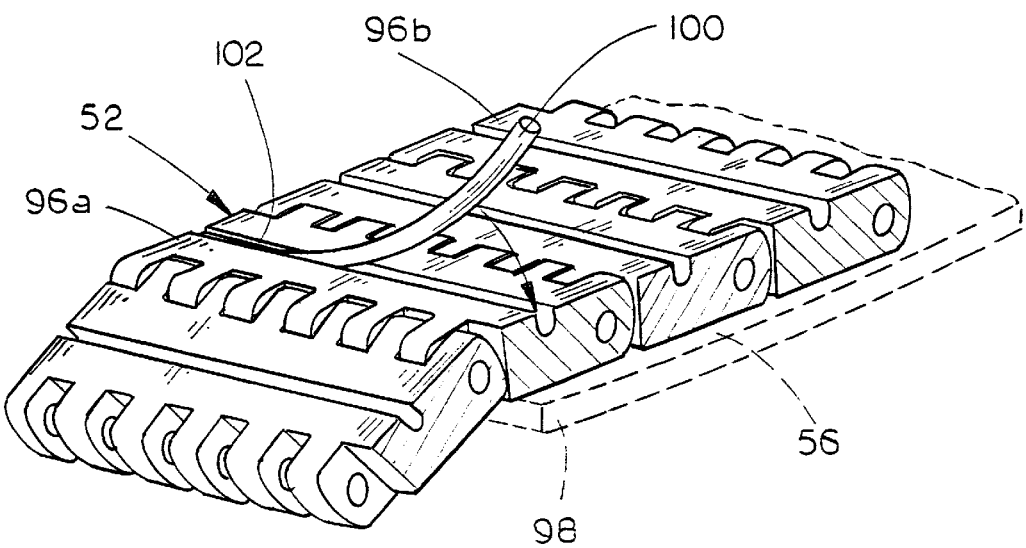
FIG. 8 is an enlarged perspective view of the attachment of one end of the filter media to the carrier belt.
Figure 9:
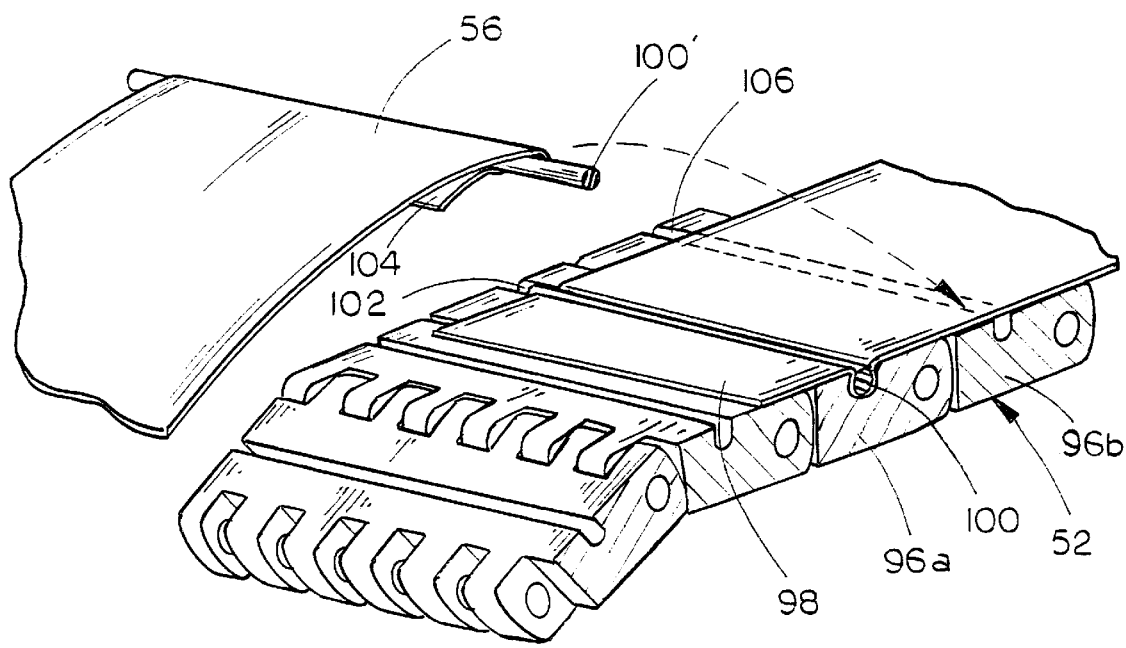
FIG. 9 is an enlarged perspective view of the attachment of the second end of the filter media to the carrier belt.

Referring now to FIGS. 8 and 9, carrier belt 52 is formed of a plurality of links 96 which are hinged together. Each link 96 extends transversely across the entire width of the carrier belt 52. Two special links 96a and 96b are provided for attachment of the media belt 56 to the carrier belt 52. Although the preferred construction of the carrier belt 52 is as described, other forms of the carrier belt may also be utilized.

In order to attach media belt 56 to carrier belt 52, a first end 98 of filter media belt 56 is attached to link 96a along its entire transverse width. This attachment is accomplished by tamping a flexible retention rod 100 into a groove 102 formed along the entire length of the upper surface of link 96a. The tight fit of retention rod 100 in groove 102 retains the filter media material in position. The carrier belt is then advanced through one complete cycle while the filter media belt 56 is retained taut against the carrier belt 52. Once first link 96a has passed under the second end 102 of belt 56, the carrier belt 52 is stopped. Second end 102 is then wrapped around a second retention rod 100' and this second retention rod (with the wrapped second end 102 of filter media belt 56 wrapped therearound) is tamped into the upper groove 106 of last link 96b such that the second end 104 of filter media belt 56 overlaps the first end 98 and the first retention rod 100. Although the above-described method is the preferred method of attaching the media belt 56 to the carrier belt 52, other methods may also be used. For example, the carrier belt 52 may be provided with a Velcro strip extending across the width thereof adapted to removably receive a second Velcro strip which is attached to the media belt 56. Further, short strips of Velcro could be used to attach the media belt 56 to the carrier belt 52. Additionally, the media belt 56 could be provided with grommets secured thereto to facilitate the insertion of wires or the like therethrough which are looped around a portion of the carrier belt 52. The numeral 110 refers generally to a liquid input means for discharging liquid into the pool forming assembly 14.

Whereas the filtration system of the present invention has been shown and described in connection with the preferred embodiments thereof, many modifications, substitutions and additions may be made which are within the intended broad scope of the appended claims.

We claim:

1. A gravity liquid filtration apparatus, comprising:
   a housing having opposing side walls, forward and rearward ends, an open top and an open bottom;
   a pool forming assembly mounted between said side walls, including:
     a central shaft;
     two spaced-apart containment discs rotatably mounted on the shaft;
     said discs having peripheral edges;
   a filtration media belt;
   an endless loop filter media carrier belt for supporting said filtration media belt in an endless loop fashion and for pressing it against the peripheral edges of the discs along corresponding bottom arcs thereof;
   said carrier belt including an open mesh, and supported on a plurality of rollers, such that an upper run thereof is pressed towards the peripheral edges of the discs;
   a drive means for driving the carrier belt on the rollers;
   liquid input means for discharging liquid into the pool forming assembly; and
   a separation pan beneath the pool forming assembly located to receive liquid filtered through an upper run of said filtration media belt supported on the upper run of the carrier belt;
   said separation pan located between a lower run of the carrier belt and the upper run of the carrier belt, and having a first drainage spout for draining liquid therefrom located laterally outwardly of a first side edge of the lower run of the carrier belt, to drain filtered liquid out the bottom of the housing.

2. The apparatus of claim 1, wherein said separation pan includes forward and rearward plates converging towards one another and connected to a bottom plate, said forward, rearward and bottom plates having a transverse width greater than the distance between the discs, and the drainage spout positioned in the bottom plate.

3. The apparatus of claim 2, wherein the separation pan includes a second drainage spout formed in the bottom plate and located laterally outwardly of a second side edge of the carrier belt lower run.

4. The apparatus of claim 3, further comprising a backwash assembly mounted between the upper and lower runs of the carrier belt and downstream of the pool forming assembly, for removing particulate loaded on the filter media.

5. The apparatus of claim 4, wherein said backwash assembly includes:
   a first spray rod extending laterally across a width of the carrier belt from side edge to side edge, having a plurality of nozzles directed downwardly towards an inward surface of the carrier belt lower run for spraying fluid through the carrier belt and filter media carried on the carrier belt; and
   a second spray rod extending across the width of the carrier belt, located parallel to and downstream of the first spray rod, the second spray rod having a plurality of nozzles therealong directed downwardly towards the carrier belt lower run inward surface;
   said first spray rod and nozzles connected to a source of air; and
   said second spray rod and nozzles connected to a source of liquid.

6. The apparatus of claim 5, further comprising a third spray rod extending across the width of the carrier belt, located parallel to and downstream of the second spray rod, and having a plurality of nozzles directed downwardly towards the carrier belt lower run inward surface, said third spray rod connected to a source of air.

7. The apparatus of claim 6:
   wherein the nozzles of the first spray rod spray a first overlapping pattern of air spray on the carrier belt covering the entire width of the carrier belt;
   wherein the nozzles on the second spray rod spray a second overlapping pattern of liquid spray covering the entire width of the carrier belt;
   wherein the nozzles on the third spray rod spray a third overlapping pattern of air spray covering the entire width of the carrier belt; and
   wherein the first, second and third overlapping patterns are spaced-apart from one another.

8. The apparatus of claim 7, wherein the backwash assembly further comprises an elongated blade having an upper horizontal scraping edge mounted below the lower run of the filter media belt with the scraping edge in contact with an outward surface of the filter media belt, for scraping particulate from the filter media.

9. The apparatus of claim 8, wherein said blade scraping edge extends across the entire width of the filter media belt.

10. The apparatus of claim 9, wherein said blade is located between the first and second overlapping patterns.

11. The apparatus of claim 10, further comprising means connected between the blade and the housing for biasing the blade upwardly into contact with the filter media outward surface.

12. The apparatus of claim 11, wherein said backwash assembly further includes an open topped catch pan located below the lower run of the filter media belt directly below the second overlapping pattern, for receiving liquid sprayed through the filter media by the second spray rod.

13. The apparatus of claim 12, wherein said catch pan includes opposing vertical sides, opposing vertical ends, and a sloping bottom, said catch pan extending across the entire width of the filter media belt and having a drain spout formed in a lower end of the bottom.

14. The apparatus of claim 13, further comprising a spray nozzle mounted in one end of the catch pan and connected to a source of liquid, for spraying an interior of the catch pan.

15. The apparatus of claim 14, further comprising a pair of freely rotatable tracking wheels in frictional engagement with the outward surface of the filter media belt and located along opposing edges of the media belt, for pressing the media belt on to the carrier belt.

16. The apparatus of claim 15, wherein said tracking wheels reside in planes diverging downstream relative to movement of the carrier belt, to frictionally draw the filter media taut between the tracking wheels.

17. The apparatus of claim 16, wherein the planes of the tracking wheels also diverge vertically towards the carrier belt.

18. The apparatus of claim 17, wherein said carrier belt is formed of a plurality of links pivotally connected by parallel hinges extending laterally the width of the belt, a first of said links being pivotally connected to a last of said links;
    said first and last links including means for attaching first and second ends of the filter media belt thereto to form a continuous loop around an outward surface of the carrier belt with the second end overlapping the first end.

19. The apparatus of claim 18, wherein said means for attaching the ends of the filter belt to the first and last links includes:
    a groove formed in an outward force of each of the first and last links, extending the width of the carrier belt;
    the first end of the filter belt wrapped around a first elongated flexible rod;
    said first rod journaled for a frictional fit within the groove in the first link;
    the second end of the filter belt wrapped around a second elongated flexible rod; and
    the second rod journaled for a friction fit within the groove in the last link.

20. A gravity liquid filtration apparatus, comprising:
    a housing having opposing side walls, forward and rearward ends, an open top and an open bottom;
    a pool forming assembly mounted between said side walls, including:
        a central shaft;
        two spaced-apart containment discs rotatably mounted on the shaft;
        said discs having peripheral edges;
    a filtration media belt;
    an endless loop filter media carrier belt for supporting said filtration media belt in an endless loop fashion and for pressing it against the peripheral edges of the discs along corresponding bottom arcs thereof;
    said carrier belt including an open mesh, and supported on a plurality of rollers, such that an upper run thereof is pressed towards the peripheral edges of the discs;
    a drive means for discharging liquid into the pool forming assembly; and
    a backwash assembly mounted between the upper run and a lower run of the carrier belt, downstream of the pool forming assembly, for removing particulate loaded on said filtration media belt.

21. The apparatus of claim 20, wherein said backwash assembly includes:
    a first spray rod extending laterally across a width of the carrier belt from side edge to side edge, having a plurality of nozzles directed downwardly towards an inward surface of the carrier belt lower run for spraying fluid through the carrier belt and filter media carried on the carrier belt; and
    a second spray rod extending across the width of the carrier belt, located parallel to and downstream of the first spray rod, the second spray rod having a plurality of nozzles therealong directed downwardly towards the carrier belt lower run inward surface;
    said first spray rod and nozzles connected to a source of air; and
    said second spray rod and nozzles connected to a source of liquid.

22. The apparatus of claim 21, further comprising a third spray rod extending across the width of the carrier belt, located parallel to and downstream of the second spray rod, and having a plurality of nozzles directed downwardly towards the carrier belt lower run inward surface, said third spray rod connected to a source of air.

23. The apparatus of claim 22:
    wherein the nozzles of the first spray rod spray a first overlapping pattern of air spray on the carrier belt covering the entire width of the carrier belt;
    wherein the nozzles on the second spray rod spray a second overlapping pattern of liquid spray covering the entire width of the carrier belt;
    wherein the nozzles on the third spray rod spray a third overlapping pattern of air spray covering the entire width of the carrier belt; and
    wherein the first, second and third overlapping patterns are spaced-apart from one another.

24. The apparatus of claim 20, wherein the backwash assembly further comprises an elongated blade having an upper horizontal scraping edge mounted below the lower run of the filter media belt with the scraping edge in contact with an outward surface of the filter media belt, for scraping particulate from the filter media.

25. The apparatus of claim 24, wherein said blade scraping edge extends across the entire width of the filter media belt.

26. The apparatus of claim 23, wherein the backwash assembly further comprises an elongated blade having an upper horizontal scraping edge mounted below the lower run of the filter media belt with the scraping edge in contact with an outward surface of the filter media belt, for scraping particulate from the filter media.

27. The apparatus of claim 26, wherein said blade is located between the first and second overlapping patterns.

28. The apparatus of claim 24, further comprising means connected between the blade and the housing for biasing the blade upwardly into contact with the filter media outward surface.

29. The apparatus of claim 23, wherein said backwash assembly further includes an open topped catch pan located below the lower run of the filter media belt directly below the second overlapping pattern, for receiving liquid sprayed through the filter media by the second spray rod.

30. The apparatus of claim 29, wherein said catch pan includes opposing vertical sides, opposing vertical ends, and a sloping bottom, said catch pan extending across the entire width of the filter media belt and having a drain spout formed in a lower end of the bottom.

31. The apparatus of claim 30, further comprising a spray nozzle mounted in one end of the catch pan and connected to a source of liquid, for spraying an interior of the catch pan.

32. A gravity liquid filtration apparatus, comprising:

a housing having opposing side walls, forward and rearward ends, an open top and an open bottom;

a pool forming assembly mounted between said side walls, including:
   a central shaft;
   two spaced-apart containment discs rotatably mounted on the shaft;
   said discs having peripheral edges;

a filtration media belt;

an endless loop filter media carrier belt for supporting said filtration media belt in an endless loop fashion and for pressing it against the peripheral edges of the discs along corresponding bottom arcs thereof;

said carrier belt including an open mesh, and supported on a plurality of rollers, such that an upper run thereof is pressed towards the peripheral edges of the discs;

a drive means for driving the carrier belt on the rollers;

liquid input means for discharging liquid into the pool forming assembly; and a pair of freely rotatable tracking wheels in frictional engagement with the outward surface of said filtration media belt and located along opposing edges of the media belt, for pressing the media belt on to the carrier belt.

33. The apparatus of claim 32, wherein said tracking wheels reside in planes diverging downstream relative to movement of the carrier belt, to frictionally draw the filter media taut between the tracking wheels.

34. The apparatus of claim 33, wherein the planes of the tracking wheels also diverge vertically towards the carrier belt.

35. A gravity liquid filtration apparatus, comprising:

a housing having opposing side walls, forward and rearward ends, an open top and an open bottom;

a pool forming assembly mounted between said side walls, including:
   a central shaft;
   two spaced-apart containment discs rotatably mounted on the shaft;
   said discs having peripheral edges;

a filtration media belt;

an endless loop filter media carrier belt for supporting said filtration media belt in an endless loop fashion and for pressing it against the peripheral edges of the discs along corresponding bottom arcs thereof;

said carrier belt including an open mesh, and supported on a plurality of rollers, such that an upper run thereof is pressed towards the peripheral edges of the discs;

a drive means for driving the carrier belt on the rollers;

liquid input means for discharging liquid into the pool forming assembly;

said carrier belt formed of a plurality of links pivotally connected by parallel hinges extending laterally the width of the belt, a first of said links being pivotally connected to a last of said links;

said first and last links including means for attaching first and second ends of said filtration media belt thereto to form a continuous loop around an outward surface of the carrier belt with the second end overlapping the first end.

36. The apparatus of claim 35, wherein said means for attaching the ends of the filter belt to the first and last links includes:

a groove formed in an outward force of each of the first and last links, extending the width of the carrier belt;

the first end of the filter belt wrapped around a first elongated flexible rod;

said first rod journaled for a frictional fit within the groove in the first link;

the second end of the filter belt wrapped around a second elongated flexible rod; and the second rod journaled for a friction fit within the groove in the last link.

37. A gravity liquid filtration apparatus, comprising:

a housing;

a pool forming assembly in said housing for forming a pool;

an endless loop filter media carrier belt adapted to move through said pool;

a filtration media belt wrapped around said carrier belt and having opposite ends;

and means for removably securing said opposite ends of said media belt to said carrier belt to form an endless loop.

* * * * *